United States Patent
Yang et al.

(10) Patent No.: US 11,079,728 B2
(45) Date of Patent: Aug. 3, 2021

(54) SMART FACTORY PLATFORM FOR PROCESSING DATA OBTAINED IN CONTINUOUS PROCESS

(71) Applicants: Won Mo Yang, Yongin-si (KR); Hyun Woo Yu, Seoul (KR); Eun Kgu Kim, Seoul (KR); Man Jin Park, Seongnam-si (KR); Jang Soo Jung, Seongnam-si (KR); Tong Ki Kim, Seongnam-si (KR); Young Lea Lee, Yongin-si (KR); Seong Cheol Park, Yongin-si (KR); Sung Yong Lee, Incheon (KR); Kyung Ho Ku, Hanam-si (KR); Seung Hyun Seo, Gwangju-si (KR); Nam Geon Yang, Yongin-si (KR); Woo Kyum Kim, Yongin-si (KR); Jin Woong Kang, Seoul (KR); Seo Yeon Hwang, Seongnam-si (KR); In Lee, Gwangyang-si (KR)

(72) Inventors: Won Mo Yang, Yongin-si (KR); Hyun Woo Yu, Seoul (KR); Eun Kgu Kim, Seoul (KR); Man Jin Park, Seongnam-si (KR); Jang Soo Jung, Seongnam-si (KR); Tong Ki Kim, Seongnam-si (KR); Young Lea Lee, Yongin-si (KR); Seong Cheol Park, Yongin-si (KR); Sung Yong Lee, Incheon (KR); Kyung Ho Ku, Hanam-si (KR); Seung Hyun Seo, Gwangju-si (KR); Nam Geon Yang, Yongin-si (KR); Woo Kyum Kim, Yongin-si (KR); Jin Woong Kang, Seoul (KR); Seo Yeon Hwang, Seongnam-si (KR); In Lee, Gwangyang-si (KR)

(73) Assignee: POSCO ICT CO., LTD., Pohang-si (KR)

( * ) Notice: Subject to any disclaimer, the term of this patent is extended or adjusted under 35 U.S.C. 154(b) by 872 days.

(21) Appl. No.: 15/693,158

(22) Filed: Aug. 31, 2017

(65) Prior Publication Data

US 2018/0059630 A1 Mar. 1, 2018

(30) Foreign Application Priority Data

Sep. 1, 2016 (KR) .................. 10-2016-0112865
Sep. 2, 2016 (KR) .................. 10-2016-0113151

(Continued)

(51) Int. Cl.
*G05B 19/042* (2006.01)
*G06F 9/50* (2006.01)
(Continued)

(52) U.S. Cl.
CPC ............ *G05B 19/042* (2013.01); *G06F 7/08* (2013.01); *G06F 9/4887* (2013.01); *G06F 9/5038* (2013.01); *G05B 2219/25232* (2013.01)

(58) Field of Classification Search
CPC .............. H04L 63/104; G05B 19/042; G05B 2219/25232; G06F 9/5038; G06F 7/08; G06F 9/4887; G06F 9/48
(Continued)

(56) References Cited

U.S. PATENT DOCUMENTS 8,117,085 B1 * 2/2012 Smith ................ G06Q 30/0641
705/26.7
2003/0155415 A1 * 8/2003 Markham ............ G06Q 50/00
235/376
(Continued)

FOREIGN PATENT DOCUMENTS

| CN | 104036371 A | 9/2014 |
| JP | 2002049603 A | 2/2002 |

(Continued)

OTHER PUBLICATIONS

Office Action dated Sep. 20, 2018 for Korean Patent Application No. 10-2016-0113151; 7 pgs.; Korean Intellectual Property Office, Republic of Korea.

(Continued)

*Primary Examiner* — Hicham Skhoun
(74) *Attorney, Agent, or Firm* — Andrew D. Fortney; Central California IP Group, P.C.

(57) ABSTRACT

Disclosed is a smart factory platform for processing data obtained in a continuous process including a first process (Continued)

and a second process following the first process. The smart factory platform includes a distributed parallel processing system including at least one processing unit that generates mapping data by mapping a process identification (ID) to collection data collected from the continuous process and sorts the mapping data to generate sorting data, the process ID defining a process where the collection data occurs and the sorting data being generated for association processing between pieces of collection data collected from different processes; and a big data analysis system storing the sorting data with respect to the process ID.

23 Claims, 10 Drawing Sheets

(30) Foreign Application Priority Data

Sep. 2, 2016 (KR) .......................... 10-2016-0113506
Sep. 2, 2016 (KR) .......................... 10-2016-0113516

(51) Int. Cl.
*G06F 7/08* (2006.01)
*G06F 9/48* (2006.01)

(58) Field of Classification Search
USPC ........................................................ 707/600
See application file for complete search history.

(56) References Cited

U.S. PATENT DOCUMENTS

| | | | | |
|---|---|---|---|---|
| 2012/0190379 A1* | 7/2012 | Hassan | ................... | G01S 19/34 |
| | | | | 455/456.1 |
| 2013/0135115 A1* | 5/2013 | Johnson | ................ | H04W 72/04 |
| | | | | 340/870.02 |
| 2014/0039337 A1* | 2/2014 | Kampman | ........... | A61B 5/0022 |
| | | | | 600/523 |
| 2016/0034836 A1 | 2/2016 | Leem et al. | | |
| 2016/0322078 A1* | 11/2016 | Bose | ..................... | A63F 13/217 |

FOREIGN PATENT DOCUMENTS

| | | | |
|---|---|---|---|
| JP | 2016024486 | A | 8/2016 |
| KR | 100468509 | B1 | 1/2005 |
| KR | 1020150099943 | A | 2/2015 |
| KR | 10-2015-0062596 | A | 6/2015 |
| KR | 1020150112357 | A | 10/2015 |
| KR | 10-2016-0015505 | A | 2/2016 |

OTHER PUBLICATIONS

Kishi Tatsuya; "Method and Apparatus for Dynamic Load Distribution"; Abstract of JP2002049603 A; Feb. 15, 2002; Japanese Patent Office, Tokoyo, Japan.
Office Action dated Oct. 19, 2017 for Korean Patent Application No. 10-2016-00113516; 5 pgs; State Intellectual Property Office of the P.R.C., People's Republic of China.
Leem Chang Ryul et al.; "Method and System for Processing a Data from Equipment"; Bibliographic data of KR10-2016-0015505 (A); Feb. 15, 2016; http://worldwide.espacenet.com.
Kim Bo Young et al.; "System and Method for Distributing Big Data"; Bibliographic data of KR10-2015-0062596 (A); Jun. 8, 2015; http://worldwide.espacenet.com.
Office Action dated Nov. 19, 2017 for Korean Patent Application No. 10-2016-0112865; 4 pgs.; Korean Intellectual Property Office, Republic of Korea.
Office Action dated Jan. 5, 2018 for Korean Patent Application No. 10-2016-0113151; 6 pgs.; Korean Intellectual Property Office, Republic of Korea.
Funayama Hirotaka; "Data Utilization System and Control Method Therefor"; Abstract of Japan Publication No. 2016024486 A: Publication Date: Aug. 2, 2016; Japanese Patent Office, Tokoyo, Japan.
Sang Hoon Lee; "Sensor Data Processing System and Method Therefor"; Abstract of Korean Publication No. 1020150112357 A: Publication Date: Jul. 10, 2015; https://kpa.kipris.or.kr.
Gyu Hongh Lee; "Energy Integrated Management System"; Abstract of Korean Publication No. 1020150099943 A: Publication Date: Feb. 9, 2015; https://kpa.kipris.or.kr.
Hyeon Ju Baek et al; "SECS Data Conversion Apparatus"; Abstract of Korean Publication No. 1020040052880 A: Publication Date: Jun. 23, 2004; https://kpa.kipris.or.kr.
Office Action dated Mar. 22, 2021 for Chinese Patent Application No. 201710780183.7; 6 pgs.; State Intellectual Property Office of the P.R.C., People's Republic of China.

* cited by examiner

SMART FACTORY PLATFORM FOR PROCESSING DATA OBTAINED IN CONTINUOUS PROCESS

CROSS-REFERENCE TO RELATED APPLICATIONS

This application claims the benefit of the Korean Patent Applications No. 10-2016-0112865 filed on Sep. 1, 2017, No. 10-2016-0113151 filed on Sep. 2, 2017, No. 10-2016-0113506 filed on Sep. 2, 2017, and No. 10-2016-0113516 filed on Sep. 2, 2017, which are hereby incorporated by reference as if fully set forth herein.

BACKGROUND

Field of the Invention

The present disclosure relates to factory data processing, and more particularly, to processing of data obtained in a continuous process.

Discussion of the Related Art

A plurality of processes for producing a finished product by using raw materials are continuously performed, and output products of the respective processes are combined with one another and are provided to subsequent processes, or a state of an output product of a specific process is changed and the state-changed product is provided to a subsequent process. In this manner, a production method where the processes are associated with one another is referred to as a continuous process production method. Examples of representative industries using the continuous process production method include steel industry, energy industry, paper industry, oil refining industry, etc.

In industries using the continuous process production method, unlike industries using a single process production method, since raw materials or intermediate goods move at a high speed, a data obtainment period is short, and the amount of data is large. Also, since a product is produced in a factory environment including much noise, dust, water, and/or the like, a measurement error occurs frequently, and depending on a working method, intermediate goods are combined with one another or a position of a material moves.

Therefore, industries using the continuous process production method need a system that processes much data in real time and processes pieces of data, generated in respective processes, through association between the pieces of data.

However, a conventional factory data processing system (for example, a steel data processing system) disclosed in Korean Patent Publication No. 10-2015-0033847 (title of invention: digital factory production capacity management system based on real-time factory situation, published on Apr. 2, 2015) processes and analyzes data generated in a single process, and for this reason, cannot process much data generated in a continuous process in real time and cannot also analyze a correlation between pieces of data generated in respective processes.

SUMMARY

Accordingly, the present disclosure is directed to provide a smart factory platform that substantially obviates one or more problems due to limitations and disadvantages of the related art.

An aspect of the present disclosure is directed to provide a smart factory platform for processing data obtained in a continuous process.

Another aspect of the present disclosure is directed to provide a method of controlling a load of a processing unit for processing data obtained in a continuous process.

Another aspect of the present disclosure is directed to provide a method of storing data obtained in a continuous process, based on a distributed file system.

Another aspect of the present disclosure is directed to provide a method of classifying data obtained in a continuous process into load data and no-load data to perform processing on the data.

Another aspect of the present disclosure is directed to provide a method of dividing and storing data obtained in a continuous process by a predetermined data number unit.

Another aspect of the present disclosure is directed to provide a method of performing in parallel an operation of processing data, obtained in a continuous process, into a file.

Another aspect of the present disclosure is directed to provide a method of receiving and storing data obtained in a continuous process, based on the normal operation or not of a queue server storing the obtained data.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a smart factory platform for processing data obtained in a continuous process including a first process and a second process following the first process, the smart factory platform including: a distributed parallel processing system including at least one processing unit that generates mapping data by mapping a process identification (ID) to collection data collected from the continuous process and sorts the mapping data to generate sorting data, the process ID defining a process where the collection data occurs and the sorting data being generated for association processing between pieces of collection data collected from different processes; and a big data analysis system storing the sorting data with respect to the process ID.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Reference will now be made in detail to the exemplary embodiments of the present disclosure, examples of which are illustrated in the accompanying drawings. Wherever possible, the same reference numbers will be used throughout the drawings to refer to the same or like parts.

Hereinafter, embodiments of the present disclosure will be described in detail with reference to the accompanying drawings.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Figure 1:
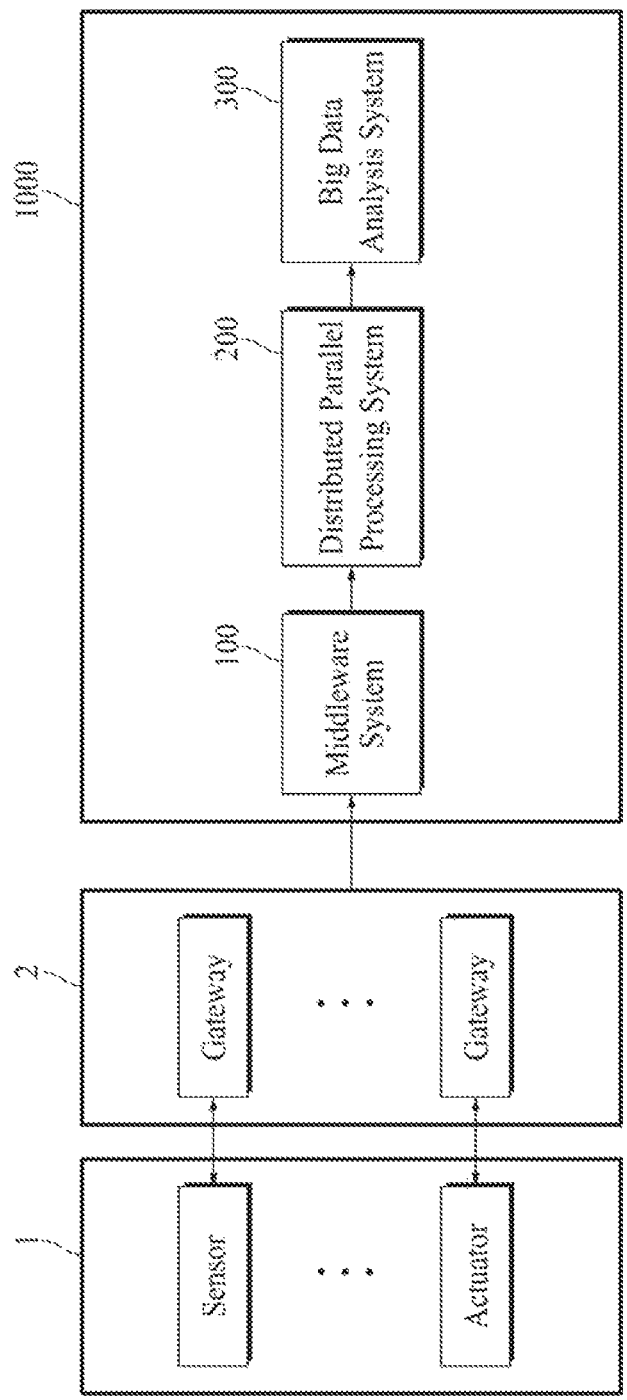
FIG. 1 is a diagram illustrating a smart factory architecture according to an embodiment of the present disclosure.

FIG. 1 is a diagram illustrating a smart factory architecture according to an embodiment of the present disclosure.

As illustrated in FIG. 1, the smart factory architecture according to an embodiment of the present disclosure may include a data collection system 1, a network system 2, and a smart factory platform 1000.

The data collection system 1 collects data generated in a continuous process. The continuous process may denote a process where a plurality of processes for producing a finished product by using raw materials are continuously performed, and output products of the respective processes are combined with one another and are provided to subsequent processes, or a state of an output product of a specific process is changed and the state-changed product is provided to a subsequent process. A representative example of the continuous process may include a steel process. Hereinafter, for convenience of description, the continuous process is assumed as the steel process and will be described.

The steel process may include various processes such as an iron making process, a steel making process, a continuous casting process, and a rolling process. The data collection system 1 may collect microdata generated in an operation of performing the various processes such as the iron making process, the steel making process, the continuous casting process, and the rolling process. Here, the microdata may be data itself obtained from various sensors and may denote raw data. Hereinafter, for convenience of description, microdata obtained in a continuous process may be referred to as collection data.

The data collection system 1 may include various measuring instruments, sensors, and actuators, for collecting data generated in the continuous process. The data collection system 1 may further include a programmable controller (P/C), a programmable logic controller (PLC), and a distributed control system (DCS), which integrate or control data obtained from the measuring instrument, the sensors, and the actuator.

The network system 2 transfers the collection data to the smart factory platform 1000. The network system 2 may include a network cable, a gateway, a router, an access point (AP), and/or the like.

The smart factory platform 1000 receives the collection data through the network system 2. The smart factory platform 1000 may process the collection data, determine whether equipment, materials, and/or the like are normal or not, based on the processed collection data, and provide a search and analysis service for stored data.

In an embodiment, as illustrated in FIG. 1, the smart factory platform 1000 according to the present disclosure may include a middleware system 100, a distributed parallel processing system 200, and a big data analysis system 300.

The middleware system 100 may preprocess the collection data. The middleware system 100 may be connected to level 0 to level 2 devices.

Figure 2:
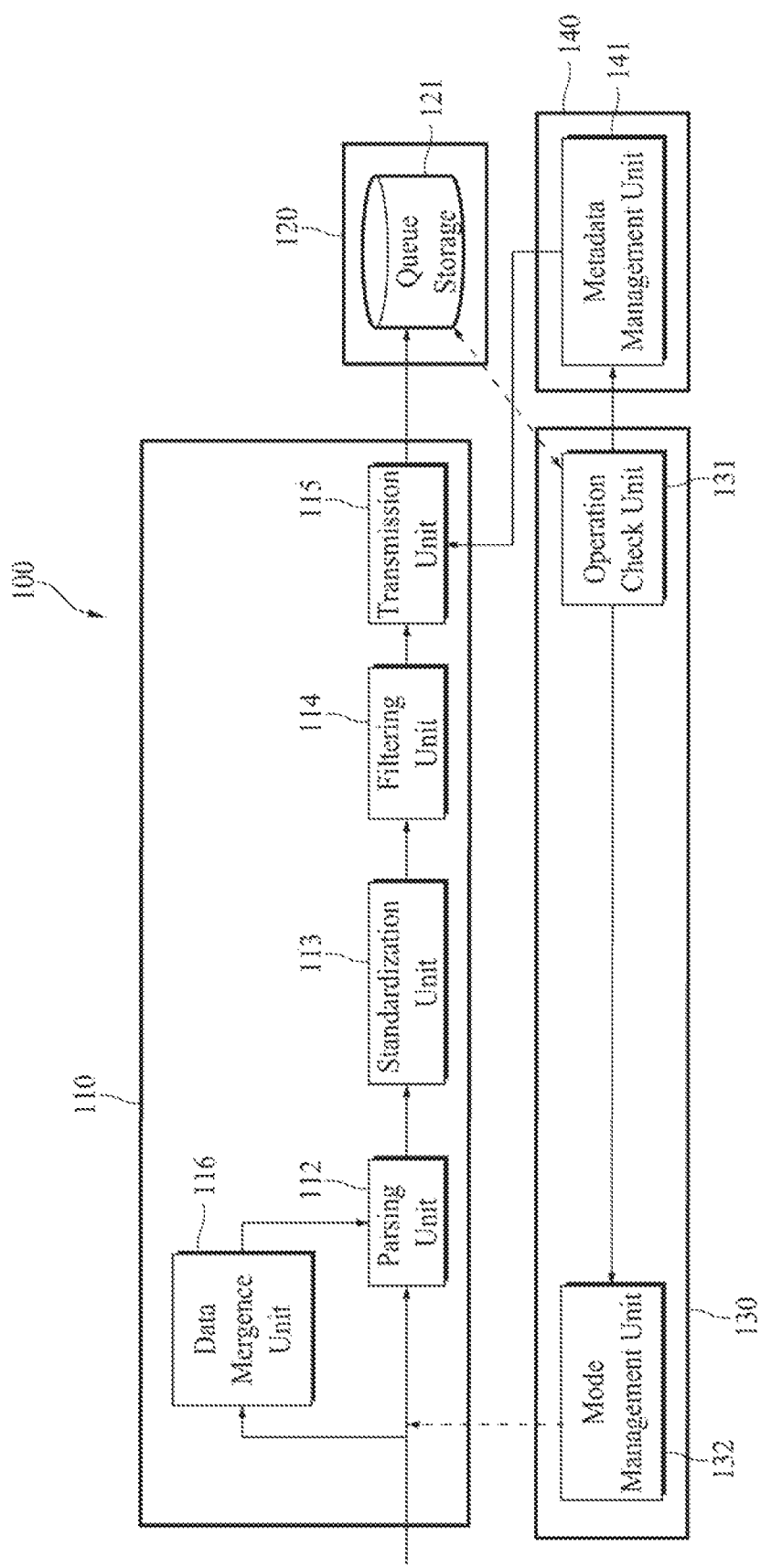
FIG. 2 is a block diagram illustrating a configuration of a middleware system according to an embodiment of the present disclosure.
Figure 3:
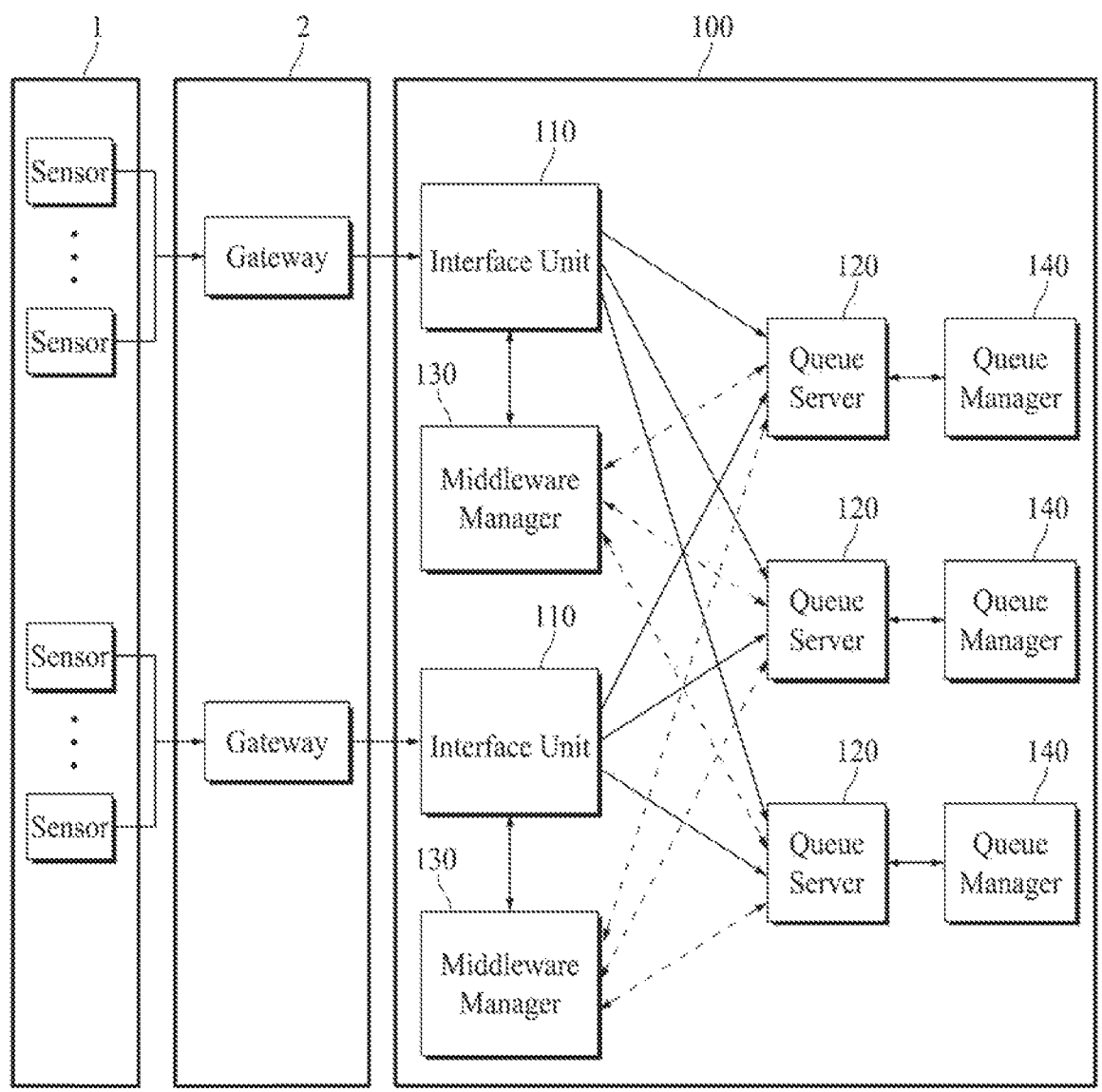
FIG. 3 is a diagram illustrating a configuration of a middleware system including a plurality of processing units and a plurality of queue storages.

To provide a more detailed description with reference to FIG. 2, the middleware system 100 may include an interface unit 110 and a queue server 120. Also, the middleware system 100 may further include a middleware manager 130 and a queue manager 140.

The interface unit 110 may preprocess pieces of collection data for performing association processing of the pieces of collection data. The interface unit 110 may standardize the collection data to preprocess the collection data. To this end, the interface unit 110 may include at least one of a parsing unit 112, a standardization unit 113, a filtering unit 114, and a transmission unit 115.

The parsing unit 112 may parse the collection data to generate parsing data. The collection data may have a structure where a group identification (ID) including a plurality of item IDs, a collection time, and a plurality of measurement values are repeated. In this case, each of the item IDs is for identifying a measured attribute and may be a value representing which attribute of attributes of equipment, materials, and products has been measured, and for example, may be a temperature or humidity. The group ID may be a representative value where some items are grouped by positions or by processes in a specific process. The group ID may include the collection time.

When the collection data is received in a structure where the group ID, the collection time, and the plurality of measurement values are repeated without separate classification, the parsing unit 112 may parse the collection data based on a predetermined layout, for association processing of the collection data.

The parsing unit 112 may parse the collection data by group IDs and may match the plurality of measurement values with the plurality of item IDs included in the group ID to generate the parsing data having a structure which includes a single item ID, a collection time, and a single measurement value.

The parsing unit 112 may parse the collection data, based on a message layout of a collection data full text.

The standardization unit 113 may standardize the parsing data to generate standardization data. The standardization unit 113 may convert an item ID included in each of pieces of parsing data into a standard item ID according to a predetermined standard conversion criterion for each parsing data and may integrate a unit and a digit number of a measurement value included in each parsing data, thereby standardizing the parsing data. In this case, the predetermined standard conversion criterion may include standard item IDs, set by item IDs of various sensors, and a reference unit and a digit number of each of the standard item IDs.

The standardization unit 113 may convert the item ID included in each parsing data into the standardization item ID in order for pieces of data having the same measured attribute to have the same item ID.

The standardization unit 113 may preprocess the parsing data in order for some pieces of data, having the same measured attribute among pieces of parsing data, to have the same standard item ID, thereby enabling association processing to be performed on pieces of data obtained in a continuous process, based on the standard item ID.

The filtering unit 114 may select standardization data, which is to be stored in the queue server 120, from among pieces of standardization data according to a predetermined filtering criterion. For example, a grade may be previously set based on the kind of the standardization data, and the filtering unit 114 may select the standardization data which is to be stored in the queue server 120, based on the grade. In an embodiment, the grade may be determined based on significance with respect to the standard item ID of the standardization data. The filtering unit 114 may transmit the selected standardization data to the transmission unit 115.

The transmission unit 115 may store the standardization data, provided from the filtering unit 114, in the queue server 120. The transmission unit 115 may store, by group IDs or standard item IDs, the standardization data in a queue storage 121 of the queue server 120.

The transmission unit 115 may store the standardization data in a queue storage 121 which is small in load, based on loads of a plurality of queue storages 121. In another embodiment, if a queue server 120 in which the standardization data is to be stored by factories or processes is previously set among a plurality of queue servers 120, the transmission unit 115 may store the standardization data in a queue server 120 which is previously set for corresponding standardization data.

The transmission unit 115 may determine whether to store the standardization data, based on an operation mode of the interface unit 110. In detail, when the operation mode of the interface unit 110 is a normal mode, the transmission unit 115 may periodically store the standardization data in the queue server 120, and when the operation mode of the interface unit 110 is a standby mode, the transmission unit 115 may stop storing of the standardization data. In this case, the operation mode of the interface unit 110 may be determined based on the number of queue servers, operating normally, of the plurality of queue servers 120.

The interface unit 110 may further include a data mergence unit 116. The data mergence unit 116 may merge the collection data to transfer the merged collection data to the parsing unit 112, so as to enhance data processing performance. In an embodiment, the data mergence unit 116 may merge the collection data which is received at a certain time interval (for example, 0.1 sec, 1 min, or the like).

In terms of a characteristic of the continuous process, the collection data may be transferred to the parsing unit 112 at a very short period (for example, 5 ms to 20 ms). Therefore, the data mergence unit 116 may immediately transfer collection data necessary for monitoring to the parsing unit 112 without being merged and may merge the other collection data at a certain time interval to transfer the merged collection data to the parsing unit 112.

In this case, whether the collection data is necessary for monitoring or not may be set based on a significance of the collection data. For example, when an error occurs, collection data obtained from equipment or materials requiring an immediate action may be set as collection data necessary for monitoring.

In an embodiment, the middleware system 100 may further include the middleware manager 130 and the queue manager 140, for managing the operation mode of the interface unit 110.

In the middleware manager 130, an operation check unit 131 may determine whether an operation of the queue server 120 is a normal operation or not, and a mode management unit 132 may determine the operation mode of the interface unit 110.

Therefore, an availability of the interface unit 110 increases, and when an error of the queue server 120 occurs, an active action may be performed to prevent a secondary error of the interface unit 110.

The operation check unit 131 may determine whether the plurality of queue servers 120 operate normally or not. In an embodiment, the operation check unit 131 may determine whether the plurality of queue servers 120 operate normally or not, based on a response to a test signal. When the response to the test signal is not provided or a predefined response is not received from a corresponding queue server 120, the operation check unit 131 may determine that the corresponding queue server 120 does not normally operate.

The mode management unit 132 may determine the operation mode of the interface unit 110, based on an operating state of each of the plurality of queue servers 120. The mode management unit 132 may transfer an operation mode of interface unit 110 to the interface unit 110.

In an embodiment, the mode management unit 132 may determine the operation mode of the interface unit 110, based on the number of normally operating queue servers 120 among the plurality of queue servers 120. In detail, the mode management unit 132 may compare the amount of collection data received from the data collection system 1 and the number of the normally operating queue servers 120, and when the amount of the received collection data does not exceed the number of the normally operating queue servers 120, the mode management unit 132 may determine the operation mode of the interface unit 110 as a normal mode. In this case, the amount of the collection data may denote an average of the amount of collection data received in real time and the amount of periodically received collection data.

For example, the mode management unit 132 may determine the operation mode of the interface unit 110 as shown in the following Table 1.

TABLE 1

| Number of queue storages | Number of normally operating queue storages | Number of abnormally operating queue storages | Operation mode |
| --- | --- | --- | --- |
| 3 | 3 | 0 | Operation mode |
| 3 | 2 | 1 | Caution mode |
| 3 | 1 | 2 | Standby mode |
| 3 | 0 | 3 | Standby mode |

When the operation mode of the interface unit 110 is determined as the normal mode by the mode management unit 132, the interface unit 110 may store the standardization data in a predetermined queue server 120 of the plurality of queue servers 120. When the operation mode of the interface unit 110 is determined as the caution mode by the mode management unit 132, the interface unit 110 may store the standardization data in queue servers 120 other than a queue server 120 which abnormally operates. When the operation mode of the interface unit 110 is determined as the standby mode by the mode management unit 132, the interface unit 110 may stop receiving of the collection data and storing of the standardization data.

In this case, the caution mode may denote an operation mode where some of the plurality of queue servers 120 do not normally operate, but the interface unit 110 is capable of storing the standardization data in the other queue servers 120 in real time. When two or more of the plurality of queue servers 120 operate normally, the mode management unit 132 may determine the operation mode as the caution mode. The queue management unit 140 may be provided to correspond to each of the plurality of queue servers 120.

The queue management unit 140 may manage metadata corresponding to each of the plurality of queue servers 120 and may check whether the plurality of queue servers 120 operate normally or not. To this end, the queue management unit 140 may include a metadata management unit 141.

The metadata management unit 141 may manage metadata corresponding to the queue storage 121 of a corresponding queue server 120. For example, the metadata management unit 141 may manage metadata such as configuration information such as basic specification information, access information, topics, and partitions and may provide information about a topic and a partition, where data is to be stored, to the interface unit 110 based on the metadata.

When some of the plurality of queue servers 120 do not normally operate, the interface unit 110 may quickly detect a location of a data-storable queue server 120 by using metadata of the queue servers 120 to store the parsing data.

The queue server 120 may temporarily store the standardization data before processing the standardization data in real time. To this end, the queue server 120 may include at least one queue storage 121.

The queue storage 121 may be a storage for storing the standardization data for a certain time and may store data based on a disk instead of a memory, for preventing a loss of the data. A space of the queue storage 121 storing data may be divided by topics, and the queue storage 121 may divide a partition in the same topic into a plurality of partitions, thereby allowing the data to be processed in parallel.

The queue server 120 may be provided in plurality, and the plurality of queue servers 120 may be clustered. In this case, if the transmission unit 115 stores the standardization data in one of the plurality of queue servers 120, the same standardization data may be stored in the other queue servers 120.

In an embodiment, the standardization data stored in the queue server 120 may be allocated a unique group ID for each data group which the distributed parallel processing system 200 fetches from the queue server 120. Accordingly, data fetch addresses may be managed by unique group IDs, and thus, data may be stored and provided in a queue form of sequentially reading and writing data.

In this case, a plurality of interface units 110 may be more implemented by adding the interface unit 110 depending on a scale of the data collection system 1 and a physical position of a factory, and each of the interface units 110 may be implemented in a double structure for high availability (HA).

Moreover, when standardization of collection data is completed, the interface unit 110 may select one queue server 120 from among the plurality of queue servers 120 and may store standardization data in the selected queue server 120. In this case, a criterion for selecting a queue server 120 in which the standardization data is to be stored may be selected from among various rules, and for example, a queue server 120 which is lowest in load may be selected, queue servers 120 may be sequentially selected, or a queue server 120 for storing the standardization data may be previously selected and stored for each sensor from which collection data is obtained.

Moreover, each of the interface units 110 may include the middleware manager 130. Each of a plurality of middleware managers 130 may determine whether the plurality of queue storages 120 operate normally or not and may determine an operation mode of a corresponding interface unit 110.

The distributed parallel processing system 200 may process standardization data transferred from the middleware system 100. In an embodiment, the distributed parallel processing system 200 may generate mapping data where the standardization data is mapped to a process ID, and may sort pieces of mapping data in each process, for association processing of pieces of collection data collected in each process.

Figure 4:
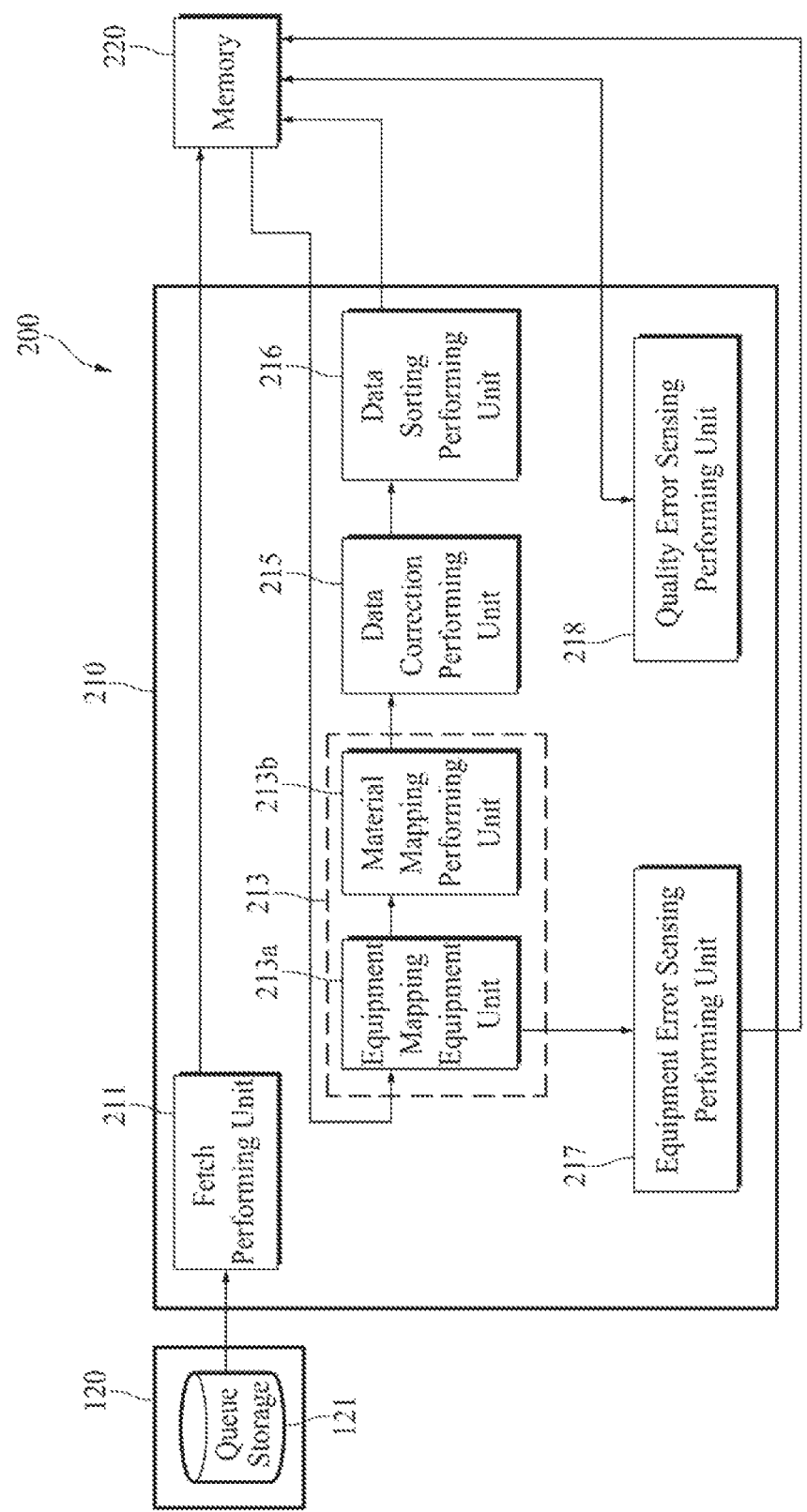
FIG. 4 is a diagram illustrating in detail a configuration of a distributed parallel processing system according to an embodiment of the present disclosure.

To provide a detailed description with reference to FIG. 4, the distributed parallel processing system 200 may include a processing unit 210 and a memory 220.

The processing unit 210 may map a process ID to standardization data to generate mapping data and may sort the mapping data so as to enable association analysis to be performed on inter-area data such as manufacturing-equipment-quality. Also, the processing unit 210 may predict omission data which is omitted in the middle of a collection period or at a point where data is not obtained because there is no sensor.

To this end, the processing unit 210 may include at least one of a fetch performing unit 211, a process mapping performing unit 213, a data correction performing unit 215, and a data sorting performing unit 216. Also, the processing unit 210 may further include an equipment error sensing performing unit 217 and a quality error sensing performing unit 218.

In an embodiment, a plurality of performing units 211 to 218 illustrated in FIG. 4 may be respectively implemented with applications which are distributed to the processing unit 210 and realize their functions. The applications may generate a working space in the processing unit 210 and may generate a plurality of threads, thereby performing the respective functions allocated for each of the performing units 211 to 218.

The fetch performing unit 211 may read standardization data from the queue storage 121 of the middleware system 100 and may store the standardization data in the memory 220. The fetch performing unit 211 may memorize location information obtained for previously searching for data of the plurality of queues storages 121, and thus, may read data next to previously-read data.

In this case, when the interface unit 110 stores, by group IDs or standard item IDs, standardization data in the queue storage 121 for association processing of pieces of collection data obtained in the continuous process, the fetch performing unit 211 may read, by group IDs or standard item IDs, the standardization data stored in the queue storage 121.

The process mapping performing unit 213 may map the standardization data, read by the fetch performing unit 211, to a process ID for identifying a process where the standardization data is obtained, thereby generating mapping data.

In an embodiment, the process mapping performing unit 213 may map an equipment ID of equipment performing each process to the standardization data to generate first mapping data, or may map a material ID of a material processed by the equipment to the standardization data or the first mapping data to generate second mapping data. To this end, the mapping performing unit 213 may include an equipment mapping performing unit 213a and a material mapping performing unit 213b.

The equipment mapping performing unit 213a may map an equipment ID of equipment, from which the standardization data is obtained, to the standardization data to generate first mapping data. The equipment mapping performing unit 213a may obtain the equipment ID which is to be mapped to the standardization data, based on a collection time when the standardization data is collected or attribute information about a sensor from which the standardization data is obtained. In an embodiment, the equipment ID may be an equipment number which is assigned for each of equipment.

The material mapping performing unit 213b may map a material ID of a material, processed by equipment from which corresponding standardization data is obtained, to the corresponding standardization data read from the memory 220 or the first mapping data generated by the equipment mapping performing unit 213a to generate the second mapping data. The material mapping performing unit 213b may obtain a material ID of a material generated through equipment from which corresponding standardization data is obtained, based on job instruction information for instructing a job performed in each process and may map the obtained material ID to the first mapping data.

In an embodiment, the material ID may be a material number which is assigned for each material.

The standardization data may include load data collected in a processed state of a material and no-load data collected in a non-processed state of the material. The material mapping performing unit 213b may immediately store the load data, mapped to an equipment ID, in a sorting data storage 222. In this case, the load data and the no-load data may be divisionally stored in the sorting data storage 222.

The data correction performing unit 215 may add data omitted from among pieces of mapping data to correct the mapping data. The data correction performing unit 215 may correct the omitted data by using mapping data, corresponding to a position closest to an area where the omitted data should be collected, and mapping data corresponding to a collection time closest to a time when the omission occurs.

In an embodiment, the data correction performing unit 215 may match a collection time, included in mapping data, with a predetermined collection period so as to correct the mapping data. For example, when continuous process data is stored at a collection period of 20 ms, the data correction performing unit 215 may correct a collection time of mapping data, of which the collection time is 15:01:11:0005 ms, to 15:01:11:000 ms and may correct a collection time of mapping data, of which the collection time is 15:01:11:0050 ms, to 15:01:11:0040 ms.

The data sorting performing unit 216 may sort mapping data or corrected mapping data, for association processing of pieces of data of respective processes.

The data sorting performing unit 216 may sort, by a material unit, pieces of mapping data mapped to the same material ID in a time order to generate first sorting data, for association processing of collection data obtained in a continuous process.

The data sorting performing unit 216 may sort pieces of first sorting data with respect to a collection position, from which corresponding data is collected, in a material corresponding to the same material ID to generate second sorting data.

In this case, the collection position may be determined based on at least one of a length of the material, a moving speed of the material, and a collection period of collection data. For example, the data sorting performing unit 216 may determine a collection position, from which the collection data is collected, in a material at every period, based on a value obtained by multiplying the collection period and the moving speed of the material and a total length of the material. Therefore, the data sorting performing unit 216 may sort the first sorting data to data which is measured at a certain position in one direction in the material.

The data sorting performing unit 216 may calculate a measurement value at each of reference points, based on a distance between the reference points arranged at predetermined intervals in each of materials and collection positions of pieces of second sorting data and may generate reference data at each reference point based on the calculated measurement value, for association processing of pieces of collection data which are collected from a first process and a second process at different periods.

The data sorting performing unit 216 may sequentially sort pieces of reference data at the reference points and the second sorting data in one direction. In an embodiment, the one direction may be at least one of a lengthwise direction of a material, a widthwise direction of the material, and a thickness direction of the material.

Hereinafter, an example where the data sorting performing unit 216 sorts pieces of reference data in a lengthwise direction in a material will be described in detail.

A plurality of first reference points may be arranged at certain intervals in a lengthwise direction of a first material which has been processed in a first process, and a plurality of second reference points may be arranged at certain intervals in a lengthwise direction of a second material which has been processed in a second process. In this case, a first material ID corresponding to the first material may be mapped to pieces of first reference data at the first reference points, and a second material ID corresponding to the second material may be mapped to pieces of second reference data at the second reference points. Therefore, the pieces of first reference data and the pieces of second reference data may be associated with one another in a material family tree (not shown) which is mapped to a material ID for each material, based on the first material ID and the second material ID.

That is, a plurality of material IDs may be linked as a tree type in the material family tree, and thus, by referring to the material family tree, pieces of mapping data of respective processes may be associated with one another, based on a material ID allocated to a material which is generated by sequentially undergoing the first process and the second process.

The data sorting performing unit 216 may store the second sorting data and the pieces of reference data, which are sorted in a lengthwise direction of a material as described above, in the memory 220.

As described above, the processing unit 210 may map a process ID such as an equipment ID or a material ID to standardization data and may sort pieces of mapping data, thereby enabling association processing to be performed on pieces of collection data obtained in the continuous process.

The equipment error sensing performing unit 217 may receive the first mapping data from the equipment mapping performing unit 213a and may determine whether equipment is normal or not, based on a predetermined equipment error determination criterion. When it is determined as a result of the determination that an error occurs in specific equipment, the equipment error sensing performing unit 217 may store the determination result in the memory 220.

The quality error sensing performing unit 218 may determine whether quality is normal or not, based on a quality error determination criterion predetermined based on the second sorting data sorted by the data sorting performing unit 216. When it is determined as a result of the determination that an error occurs in a quality of a specific material, the quality error sensing performing unit 218 may store the determination result in the memory 220.

In an embodiment, the quality error sensing performing unit 218 may generate macrodata, which is to be used as a reference of a quality error determination equation, through an operation such as prediction of an average and an error of the second sorting data and may substitute the second sorting data into the quality error determination equation to determine the occurrence or not of a quality error according to a result of the substitution.

In the above-described embodiment, it has been described above that the distributed parallel processing system 200 may map and sort standardization data by using one processing unit 210 and one memory 220. In a modification embodiment, however, the distributed parallel processing system 200 may map and sort standardization data by using a plurality of processing units 210a to 210c and a plurality of memories 220 as illustrated in FIG. 5.

Hereinafter, a distributed parallel processing system according to a modification embodiment will be described with reference to FIGS. 4 and 5.

Figure 5:
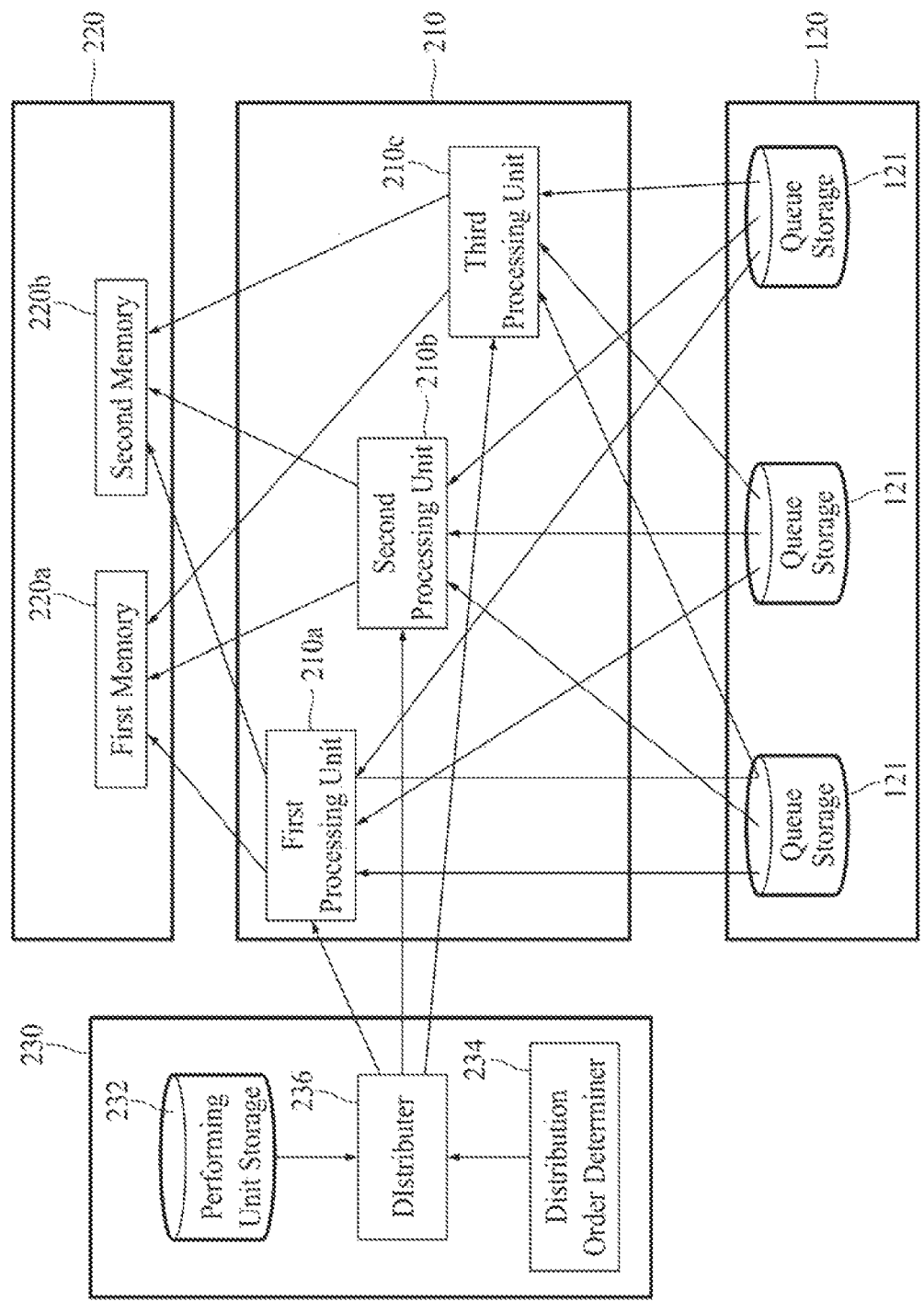
FIG. 5 is a diagram illustrating a distributed parallel processing system including a plurality of processing units and a plurality of memories.

FIG. 5 is a diagram illustrating a distributed parallel processing system 200 including a plurality of processing units and a plurality of memories. The distributed parallel processing system 200 may include a plurality of processing units 210a to 210c, a plurality of memories 220a to 220c, and a performing unit manager 230.

One or more of a plurality of performing units 211 to 218 for mapping and sorting standardization data may be distributed to the plurality of processing units 210a to 210c. The plurality of processing units 210a to 210c may distribute and parallel process at least one of a fetch performing unit 211, an equipment mapping performing unit 213a, a material mapping performing unit 213b, a data correction performing unit 215, a data sorting performing unit 216, an equipment error sensing performing unit 217, and a quality error sensing performing unit 218 to perform parallel processing and may store final result data in the memory 220, thereby processing standardization data transferred from the middleware system 100 in real time.

In an embodiment, the plurality of processing units 210a to 210c may be configured in a cluster structure. As described above, the plurality of processing units 210a to 210c may have the cluster structure, and thus, when an error occurs in a specific processing unit, the performing units 211 to 218 which are being executed in the specific processing unit having the error may move to another processing unit, thereby securing availability.

The plurality of memories 220 may store data processed by the plurality of processing units 210a to 210c. In an embodiment, in order to increase processing performance and ensure availability when an error occurs, the plurality of memories 220 may have a cluster structure like the above-described queue storages 120.

The plurality of memories 220 may be provided in a double structure for high availability (HA). That is, each of the plurality of memories 220 may include a master instance M and a slave instance S. In this case, a master instance M included in a first memory 220a and a slave instance S included in a second memory 220b may operate in pairs, and a master instance M included in the second memory 220b and a slave instance S included in the first memory 220a may operate in pairs.

Sorting data stored in the slave instance S may be backed up as a scripter-form file, for recovering the sorting data when an error occurs. In this case, the scripter-form file may denote a file where a command associated with writing or reading of the data is stored along with the data.

The master instance M and the slave instance S of each memory 220 may be configured in a single thread form, and instances and ports may be separated from each other for each writing and reading.

Hereinafter, a method of performing distributed parallel processing on an operation of mapping and sorting standardization data will be described with reference to FIG. 6 for example.

Figure 6:
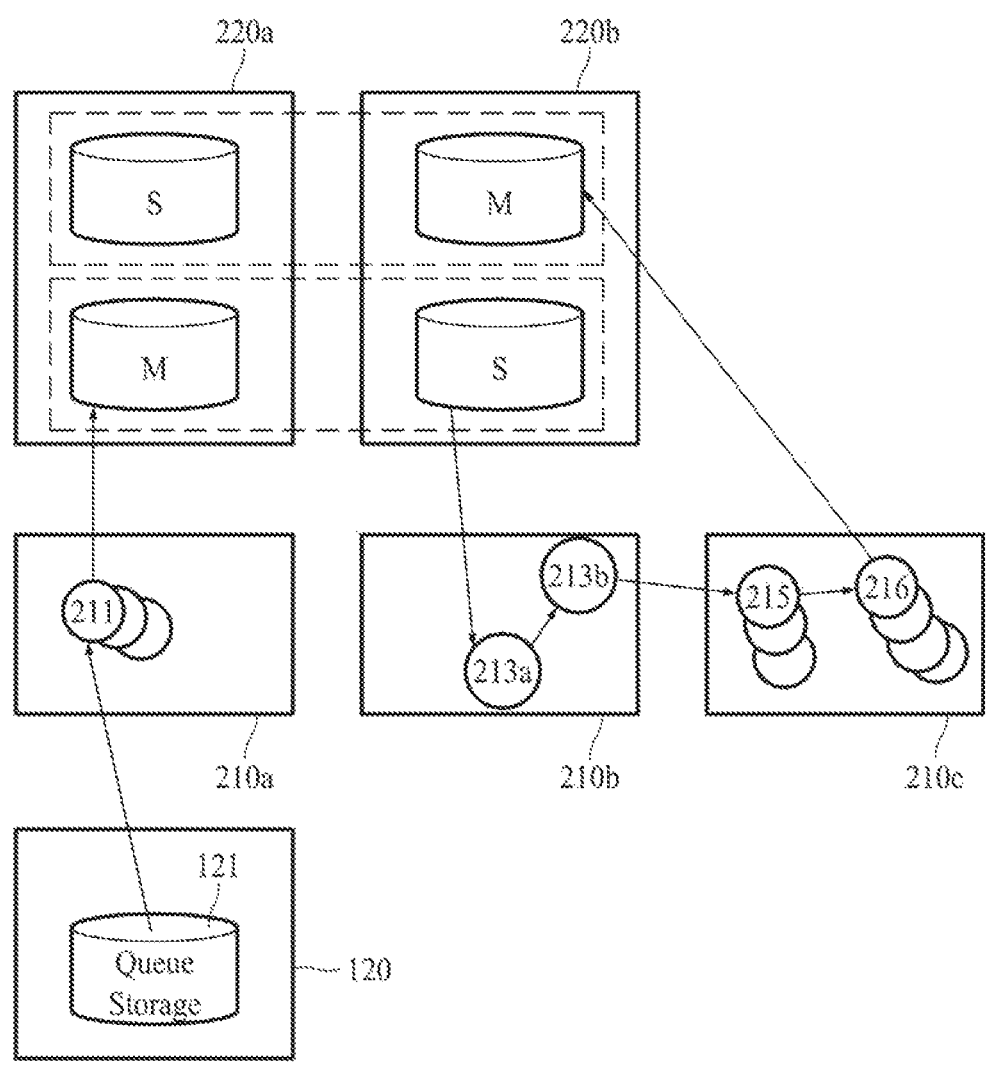
FIG. 6 is a conceptual diagram exemplarily illustrating a distributed parallel processing method applied to a data mapping and sorting job.

As illustrated in FIG. 6, since the fetch performing unit 211 is distributed to the first processing unit 210a, by executing the fetch performing unit 211, the first processing unit 210a may allow the fetch performing unit 211 to access the queue storage 121, fetch standardization data, and store the fetched data in the master instance M of the first memory 220a. In this case, data may also be copied to and stored in the slave instance S of the second memory 220b. Since the equipment mapping performing unit 213a and the material mapping performing unit 213b are distributed to the second processing unit 210b, by executing the equipment mapping performing unit 213a, the second processing unit 210b may map an equipment ID to standardization data read from the slave instance S of the second memory 220b or the slave instance S of the first memory 220a, and by executing the material mapping performing unit 213b, the second processing unit 210b may map a material ID to the standardization data or the first mapping data to which the equipment ID is mapped.

Since the data correction performing unit 215 and the data sorting performing unit 216 are distributed to the third processing unit 210c, the third processing unit 210c may execute the data correction performing unit 215 to correct mapping data omitted from among pieces of mapping data and may execute the data sorting performing unit 216 to sort the pieces of mapping data or the corrected mapping data by a material unit and store the sorted mapping data in the master instance M of the second memory 220b. In this case, data may also be stored in the slave instance S of the first memory 220a.

In the above-described embodiment, it has been described that since the plurality of memories 220 are configured in a double structure, the master instance M included in the first memory 220a and the slave instance S included in the second memory 220b operate in pairs, and the master instance M included in the second memory 220b and the slave instance S included in the first memory 220a operate in pairs.

In such an embodiment, however, the master instance M and the slave instance S may each be implemented as a single thread, and thus, when the master instance M of the first memory 220a is downed, the slave instance S of the second memory 220b cannot service all of a writing operation and a reading operation for a downtime taken until the master instance M of the first memory 220 is normalized.

Figure 7:
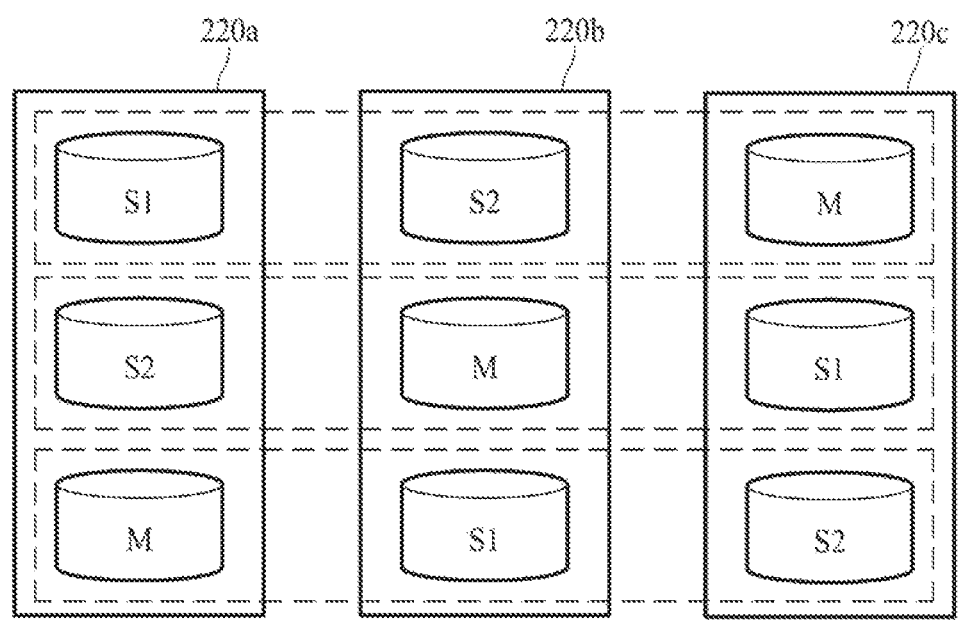
FIG. 7 is a diagram illustrating a configuration of a triplicated memory.

Therefore, in a modification embodiment, as illustrated in FIG. 7, the memories 220 may be implemented in a triple structure. In detail, each of the memories 220 according to a modification embodiment may include a master instance M, a first slave instance S1, and a second slave instance S2.

The master instance M included in the first memory 220a and the first slave instance S1 of each of the second and third memories 220b and 220c may operate in pairs. Therefore, when data is written in the master instance M included in the first memory 220a, data may also be copied to and stored in the first slave instance S1 of each of the second and third memories 220b and 220c.

Moreover, the master instance M included in the second memory 220b may operate in pairs along with the first slave instance S1 included in the first memory 220a and the second slave instance S2 included in the third memory 220c. Therefore, when data is written in the master instance M included in the second memory 220b, data may also be stored in the first slave instance S1 included in the first memory 220a and the second slave instance S2 included in the third memory 220c.

Moreover, the master instance M included in the third memory 220c and the second slave instances S2 respectively included in the first and second memories 220a and 220b may operate in pairs. Therefore, when data is written in the master instance M included in the third memory 220c, data may also be copied to and stored in the second slave instances S2 respectively included in the first and second memories 220a and 220b.

The performing unit manager 230 may distribute the plurality of performing units 211 to 218 to the plurality of processing units 210a to 210c. Also, the performing unit manager 230 may redistribute the plurality of performing units 211 to 218 to the plurality of processing units 210a to 210c, based on a load amount of each of the first to third processing units 210a to 210c according to execution of the performing units 211 to 218 distributed to the first to third processing unit 210a to 210c.

The performing unit manager 230 may include a performing unit storage 232, a distribution order determiner 234, and a distributer 236.

The plurality of performing units 211 to 218 for performing an operation of mapping and sorting standardization data may be stored in the performing unit storage 232.

The distribution order determiner 234 may determine resource use information about the processing units 210a to 210c after the plurality of performing units 211 to 218 are distributed to each of the processing units 210a to 210c by the distributer 236, and may determine a distribution order in which the plurality of performing units 211 to 218 are redistributed, so as to enable the load amounts of the processing units 210a to 210c to be controlled. In an embodiment, the distribution order determiner 234 may determine the distribution order in which the plurality of performing units 211 to 218 are redistributed, so as to enable the load amounts of the processing units 210a to 210c to become equal. Here, the determination of the distribution order may denote determining the processing units 210a to 210c which each of the performing units 211 to 218 are to be redistributed.

In another embodiment, the distribution order determiner 234 may determine a distribution order in which the plurality of performing units 211 to 218 are distributed, based on at least one of a use pattern of system resources and an average value of the system resources based on execution of an initially distributed performing unit. In such an embodiment, the system resources may include at least one of a CPU use rate, a memory use amount, a network communication amount, and a disk input/output throughput of each of the processing units 210a to 210c.

The distributer 236 may distribute the plurality of performing units 211 to 218 to the plurality of processing units 210a to 210b, based on the distribution order determined by the distribution order determiner 234.

In detail, the distributer 236 may arbitrarily distribute the plurality of performing units 211 to 218, stored in the performing unit storage 232, to the processing units 210a to 210c. Subsequently, when a predetermined idle period arrives, the distributer 236 may collect the plurality of performing units 211 to 218 distributed to each of the processing units 210a to 210c and may store the collected performing units 211 to 218 in the performing unit storage 232, and when the idle period ends, the distributer 236 may distribute the plurality of performing units 211 to 218 to a corresponding processing unit of the processing units 210a to 210c, based on the distribution order determined by the distribution order determiner 234.

The big data analysis system 300 may store sorting data, sorted by the distributed parallel processing system 200, in a big data storage space. Also, the big data analysis system 300 may manage data not to be lost and may provide a search function for historical data. Hereinafter, the big data analysis system 300 according to an embodiment of the present disclosure will be described in detail with reference to FIG. 8.

Figure 8:
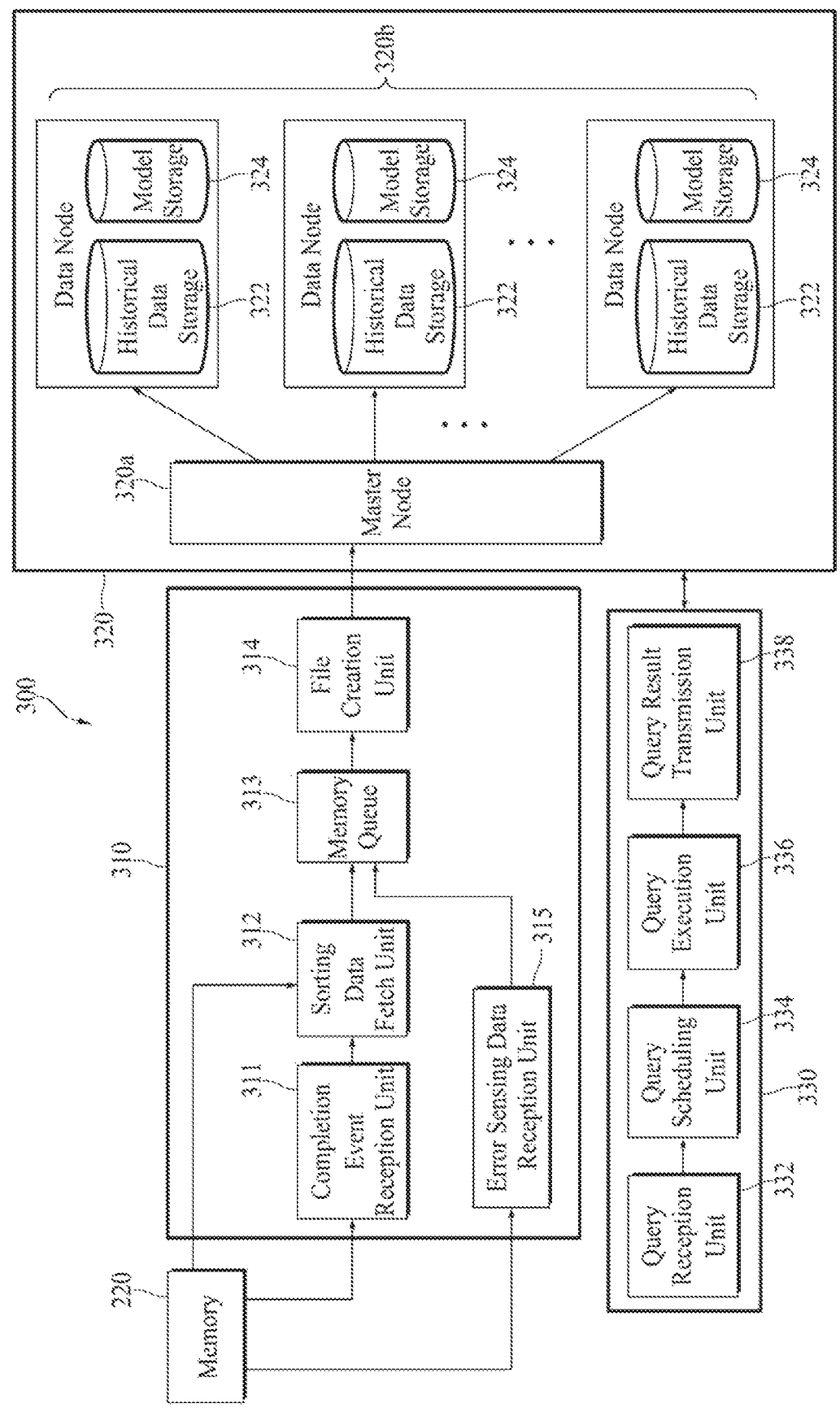
FIG. 8 is a diagram illustrating in detail a configuration of a big data analysis system according to an embodiment of the present disclosure.

FIG. 8 is a diagram illustrating in detail a configuration of a big data analysis system 300 according to an embodiment of the present disclosure. The big data analysis system 300 may include a data processing unit 310, a big data storage 320, and a query processing unit 330.

The data processing unit 310 may perform distributed parallel processing on sorting data and an error sensing result and may include at least one of a completion event reception unit 311, a sorting data fetch unit 312, a memory queue 313, a file creation unit 314, and an error sensing data reception unit 315.

The completion event reception unit 311 may monitor the memory 220 of the distributed parallel processing system 200, and when a completion event is newly stored, the completion event reception unit 311 may transfer the completion event to the sorting data fetch unit 312.

When the completion event is transferred from the completion event reception unit 311, the sorting data fetch unit 312 may search for sorting data corresponding to the completion event in the memory 220 and may store the found sorting data in the memory queue 313. In an embodiment, by using key information included in the completion event, the sorting data fetch unit 312 may check which partition and directory of the memory 2110 data corresponding to the completion event is stored in, and thus, may search for data stored in the memory 220 to store the found data in the memory queue 313.

The memory queue 313 may temporarily store data, read by the sorting data fetch unit 312, in a memory before storing the read data in the big data storage 320. The file creation unit 314 may create a physical file including the data stored in the memory queue 313 and may store the file in the big data storage 320.

The error sensing data reception unit 315 may monitor the memory 220 of the distributed parallel processing system 200, and when a new error sensing result is stored, the error sensing data reception unit 315 may store the new error sensing result in the memory queue 313.

The big data storage 320 may store the file created by the file creation unit 314. The big data storage 320 may be implemented based on a distributed file system.

The big data storage 320 may be configured with a master node 320a and a data node 320b. The master node 320a may store a lot of files created by the bid data analysis system 300 in a plurality of data nodes 320b, create and manage a job for searching for pieces of data stored in the data nodes 320b, and manage metadata.

Here, the job may denote a unit for processing a query received from the query processing unit 300 so as to search for the data stored in the data node 320b.

The metadata may include a location and a file name of the file stored in the data node 320b, a block ID where the file is stored, and a storage location of a server. For example, when the file creation unit 314 creates a file, a location and a file name of the file may be stored in the metadata, and in a case where a corresponding file is greater than a block size and thus is divided into five blocks stored in three different servers, fifteen block IDs and a storage location of each of the servers may be additionally stored in the metadata.

In performing a job of searching for data stored in the data node 320b, when distribution is performed on each job and data of a specific file is loaded, the metadata may be used as location information about the data.

A lot of files created by the big data analysis system 300 may be stored in the data node 320b. The data node 320b may be provided in plurality, and each of the plurality of data nodes 320b may include a historical data storage 322 and a model storage 324.

The historical data storage 322 included in each of the data nodes 320b may store a large amount of collection data collected by the data collection system 1 in real time, in addition to the file created by the file creation unit 314. In an embodiment, the file created by the file creation unit 314 may be separately stored in a relational database (RDB).

The model storage 324 may store a quality determination model and an error prediction model which are necessary for determining the quality of a material or a product.

The query processing unit 330 may be an element that searches for data stored in the big data storage 320 and returns the found data, and may include at least one of a query reception unit 332, a query execution unit 336, and a query result transmission unit 338. The query processing unit 330 may further include a query scheduling unit 334.

The query reception unit 332 may receive a query from a user and may interpret a received query sentence.

The query execution unit 336 may transfer the query, received through the query reception unit 322, to the big data storage 320 to allow the query to be executed, and thus, may obtain a query execution result from the big data storage 320.

The query result transmission unit 338 may transfer data, obtained as the query execution result from the big data storage 320, to the user who has requested a corresponding query.

If the query received through the query reception unit 332 consists of a plurality of lower queries, the query scheduling unit 334 may classify the received query into each of the lower queries and may transfer the classified query to the query execution unit 336.

Figure 9:
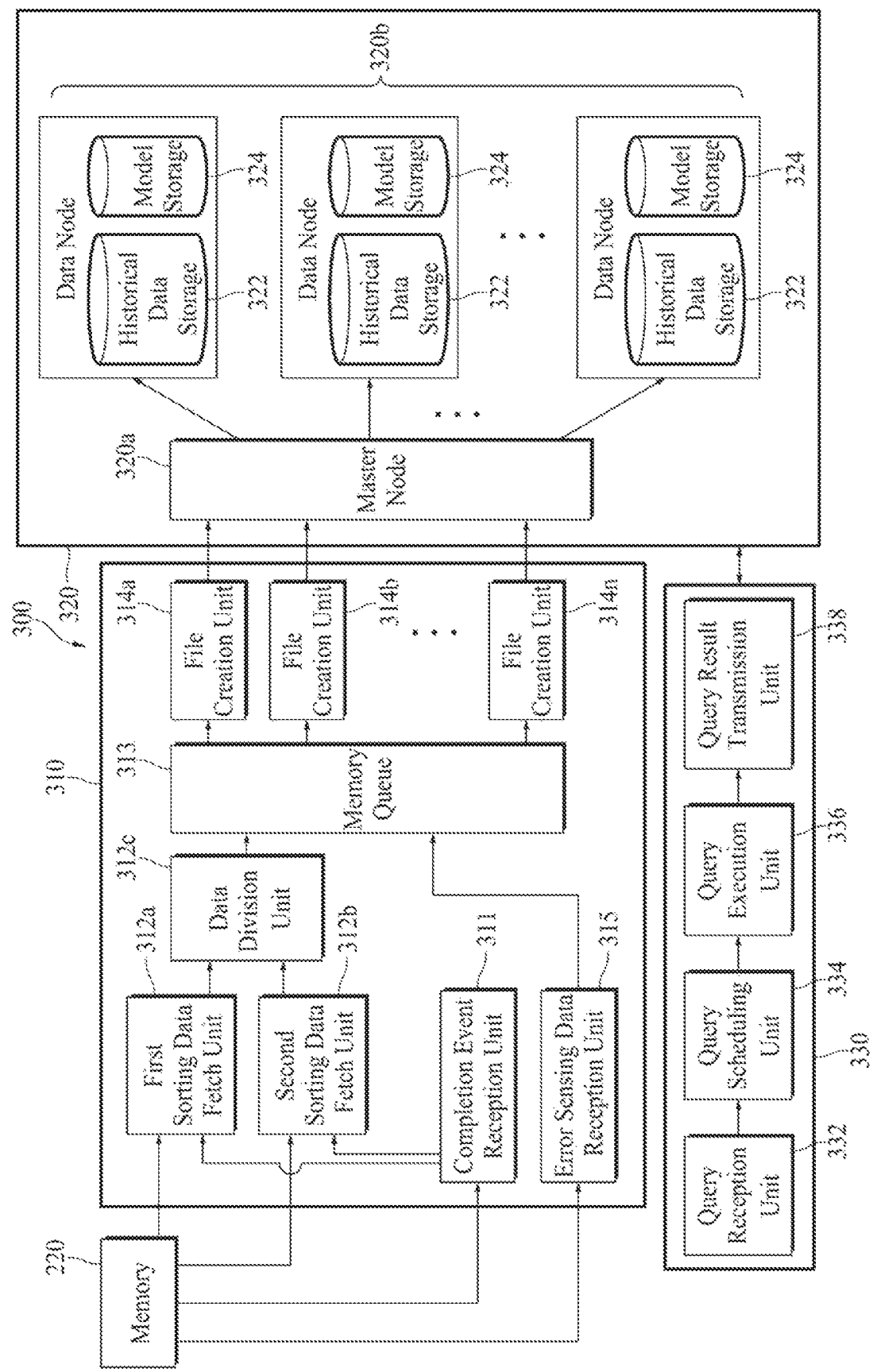
FIG. 9 is a diagram illustrating in detail a configuration of a big data analysis system according to another embodiment of the present disclosure.

FIG. 9 is a diagram illustrating in detail a configuration of a big data analysis system 300 according to another embodiment of the present disclosure.

As illustrated in FIG. 9, the big data analysis system 300 may include may include a data processing unit 310, a big data storage 320, and a query processing unit 330. The big data storage 320 and the query processing unit 330 are the same as the elements illustrated in FIG. 8, and thus, their detailed descriptions are omitted. Hereinafter, only elements, differing from the elements illustrated in FIG. 8, of elements of the data processing unit 310 will be described.

The data processing unit 310 according to another embodiment of the present disclosure may include at least one of a completion event reception unit 311, a first sorting data fetch unit 312a, a second sorting data fetch unit 312b, a data division unit 312c, a memory queue 313, a plurality of file creation units 314a to 314h, and an error sensing data reception unit 315.

Functions of the completion event reception unit 311, the memory queue 313, and the error sensing data reception unit 315 are the same as those of the elements illustrated in FIG. 8, and thus, their detailed descriptions are omitted.

Figure 10:
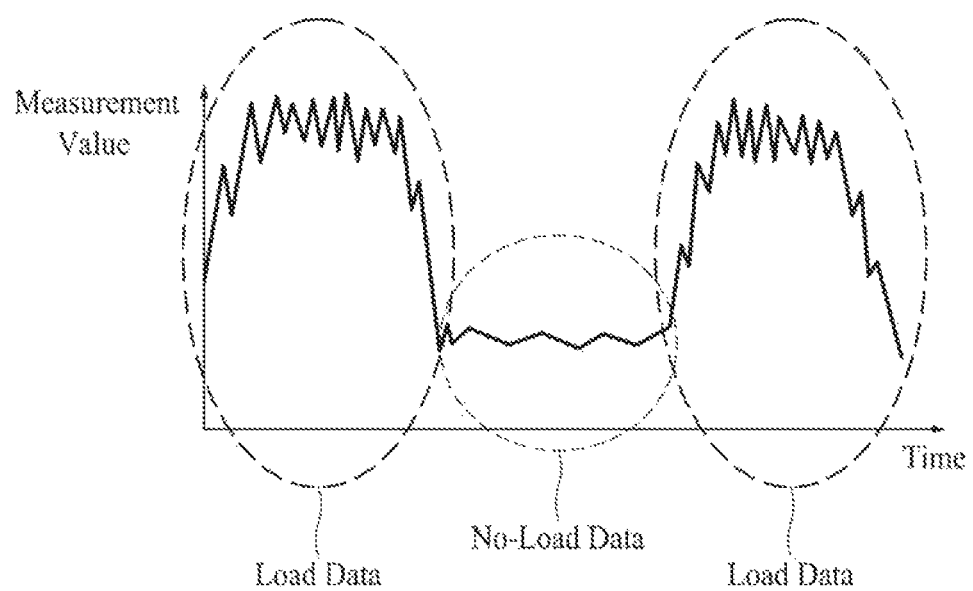
FIG. 10 is a diagram illustrating an example of load data and no-load data.

The first sorting data fetch unit 312a may read load data, mapped to an equipment ID and a material ID, from a memory 220. In the load data, as illustrated in FIG. 10, a data change occurs, and the load data has a characteristic where a data change width is large. For example, temperature data or flatness data which is obtained while a Roughing Mill (RM) or a Finishing Mill (FM) is processing an as-rolled plate in a thick plate process may correspond to the load data.

The second sorting data fetch unit 312b may read no-load data, which an equipment ID and a material ID are not mapped to, from the memory 220. Since the no-load data is measured in a state where a job is not performed, as illustrated in FIG. 10, the no-load data has a characteristic where the same value is continuously generated. For example, temperature data or flatness data which is obtained in a state where the Roughing Mill (RM) or the Finishing Mill (FM) does not process the as-rolled plate in the thick plate process may correspond to the no-load data.

The first sorting data fetch unit 312a and the second sorting data fetch unit 312b may each be provided in plurality, for more enhancing a processing speed.

In this case, in the memory 220, the load data may be stored in a first storage area (not shown), and the no-load data may be stored in a second storage area (not shown) independently of the load data.

Moreover, when an even where storing of the load data in the first storage area is completed occurs, the completion event performing unit 311 may transfer the event to the first sorting data fetch unit 312a to allow the first sorting data fetch unit 312a to read the load data from the first storage area. Also, when an even where storing of the no-load data in the second storage area is completed occurs, the completion event performing unit 311 may transfer the event to the second sorting data fetch unit 312b to allow the second sorting data fetch unit 312b to read the no-load data from the second storage area.

By using key information included in the completion event, the first or second sorting data fetch unit 312a or 312b may check which partition and directory of the first or second storage area data corresponding to the completion event is stored in, and thus, may read the load data stored in the first storage area or the no-load data stored in the second storage area.

In the above-described embodiment, the first and second storage areas may each be implemented in a queue form. An event may be stored in a queue space in the first and second storage areas, and the completion event reception unit 311 may fetch the event from the queue space. Therefore, even though the completion event reception unit 311 is downed, if the completion event reception unit 311 is recovered, an event which is being previously processed may be preferentially processed, thereby preventing a loss of an event.

Moreover, in the above-described embodiment, each of the file creation units 314a to 314n may create a file including the load data and may record the file in a load data table (not shown) of a historical data storage 322. Also, each of the file creation units 314a to 314n may create a file including the no-load data and may record the file in a no-load data table (not shown) of the historical data storage 322.

The data division unit 312c may divide, by a predetermined data number unit, the load data read by the first sorting data fetch unit 312a or the no-load data read by the second sorting data fetch unit 312b and may store the divided load data or no-load data in the memory queue 313.

The reason that the big data analysis system 300 according to another embodiment of the present disclosure divides data by the predetermined data number unit by using the data division unit 312c is because if massive data is simultaneously transferred to the memory queue 313, an out of memory occurs, and for this reason, a system is downed.

The file creation units 314a to 314n may create a physical file including data stored in the memory queue 313. As illustrated in FIG. 9, since the big data analysis system 300 according to another embodiment of the present disclosure is implemented with the plurality to file creation units 314a to 314n, the plurality if file creation units 314a to 314n may perform a file creation job in parallel, thereby enhancing a speed of the file creation job. In such an embodiment, the file creation units 314a to 314n may be clustered.

As described above, according to the embodiments of the present disclosure, data obtained in a continuous process may be processed in real time, and moreover, massive data may be processed.

Moreover, according to the embodiments of the present disclosure, a load of each processing unit may be controlled based on system resource use information based on execution of a performing unit distributed to each processing unit, thereby enhancing system processing performance.

Moreover, according to the embodiments of the present disclosure, the memory may be triplicated with one master instance and two slave instances, thereby increasing an availability of the memory.

Moreover, according to the embodiments of the present disclosure, data obtained in a continuous process may be stored in a big data storage based on the distributed file system, and thus, the obtained data may be processed in real time.

Moreover, according to the embodiments of the present disclosure, data obtained in a continuous process may be classified into load data and no-load data and processed, thereby improving a file search speed and shortening a query performing time.

Moreover, according to the embodiments of the present disclosure, data obtained in a continuous process may be divided and stored by a predetermined data number unit, thereby preventing the occurrence of an out of memory of a memory queue.

Moreover, according to the embodiments of the present disclosure, the file generation unit that processes data, obtained in a continuous process, into a file may be provided in plurality, thereby more enhancing a processing speed.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A smart factory platform that processes data from a continuous process including a plurality of continuously-performed processes that produce a finished product using raw materials, the smart factory platform comprising:
    a distributed parallel processing system including at least one processing unit that generates mapping data by mapping a process identification (ID) to collection data collected from the continuous process and sorts the mapping data to generate sorting data, the process ID being one of an equipment ID of equipment performing one of the plurality of continuously-performed processes where the collection data occurs and a material ID of a material processed through the equipment, the at least one processing unit comprising a material mapping performing unit mapping the material ID to the collection data and an equipment mapping performing unit mapping the equipment ID to the collection data, and the sorting data being generated to enable and perform association processing on pieces of the collection data collected from different ones of the continuously-performed processes; and
    a big data analysis system storing the sorting data with respect to the process ID and comprising a data processing unit (i) dividing the sorting data into load data and no-load data and (ii) respectively storing the load data and the no-load data in different tables, wherein
    the load data is data collected when the material is processed or data that changes over a range,
    the no-load data is data collected when the material is not processed or where data having a same value is continuously generated,
    the material ID is mapped to the load data, and
    the material ID is not mapped to the no-load data,
    wherein a specific process of the plurality of continuously-performed processes changes physical properties of an output product, and a subsequent process of the plurality of continuously-performed processes uses the output product having the changed physical properties as one of the raw materials, and
    the at least one processing unit further comprises a data sorting performing unit that calculates a measurement value at each of a plurality of reference points in the material and collection positions of the sorting data to generate reference data at each of the reference points for the association processing of the collection data collected from the specific process and the subsequent process at different periods.

2. The smart factory platform of claim 1, wherein the at least one processing unit maps the material ID of the material processed through the equipment.

3. The smart factory platform of claim 1, wherein the distributed parallel processing system further comprises a performing unit manager distributing the mapping of the process ID and the sorting of the mapping data to the at least one processing unit to allow distributed mapping and sorting to be performed, based on a load amount of the at least one processing unit.

4. The smart factory platform of claim 3, wherein the performing unit manager distributes the mapping of the process ID and the sorting of the mapping data for the load amount of the at least one processing unit to be controlled, based on at least one of (i) a use pattern of system resources and (ii) an average value of the system resources based on execution of one of more performing units distributed to the at least one processing unit.

5. The smart factory platform of claim 2, wherein the equipment mapping performing unit maps the equipment ID, extracted based on a collection time when the collection data is collected or attribute information about a sensor from which the collection data is collected, to the collection data.

6. The smart factory platform of claim 2, wherein the material mapping performing unit maps the material ID, extracted based on job instruction information for each process, to the collection data.

7. The smart factory platform of claim 1, wherein the data sorting performing unit performs at least one of time sorting where pieces of mapping data are sorted based on a collection time and unit sorting where pieces of mapping data are sorted by a material unit processed in the process.

8. The smart factory platform of claim 7, wherein the data sorting performing unit sequentially time-sorts mapping data to which a same material ID is mapped among the pieces of mapping data based on the collection time, or unit-sorts the mapping data with respect to a corresponding one of the collection positions from which the collection data is collected.

9. The smart factory platform of claim 8, wherein the collection position is determined based on at least one of a length of the material, a moving speed of the material, and a collection period of the collection data.

10. The smart factory platform of claim 7, wherein
the data sorting performing unit unit-sorts the mapping data and pieces of the reference data in one direction in the material, and
the pieces of the reference data are determined based on the collection positions of the collection data and a reference point of the material.

11. The smart factory platform of claim 10, wherein the one direction in the material is at least one of a lengthwise direction of the material, a widthwise direction of the material, and a thickness direction of the material.

12. The smart factory platform of claim 10, wherein first reference data corresponding to the material processed in the specific process and second reference data corresponding to the material processed in the subsequent process are associated with each other, based on a first material ID included in the first reference data and a second material ID included in the second reference data.

13. The smart factory platform of claim 7, wherein the data sorting performing unit determines the collection positions from which the collection data are collected based on a length of the material, a moving speed of the material, and a collection period of the collection data, and unit-sorts the mapping data based on the reference data, calculated based on the reference points at predetermined intervals in the material and a distance between a plurality of the collection positions at each of the reference points.

14. The smart factory platform of claim 1, wherein the data processing unit divides the load data by a predetermined data number unit and stores the divided load data in a memory queue.

15. The smart factory platform of claim 1, wherein the data processing unit comprises:
a file creation unit creating a file including the load data;
a plurality of data nodes storing the file created by the file creation unit; and
a master node distributing and storing the file created by the file creation unit to and in the plurality of data nodes, and
in response to a query for searching for the file in the plurality of data nodes, the master node generates and manages a job, which is a unit for processing the query.

16. The smart factory platform of claim 1, wherein the at least one processing unit generates the mapping data by mapping the process ID to standardization data and sorts the mapping data to (i) enable association analysis on manufacturing-equipment-quality data and/or (ii) predict omission data omitted during a collection period or at a point where data is not obtained.

17. The smart factory platform of claim 1, wherein the continuous process is a steel process.

18. The smart factory platform of claim 1, wherein the steel process includes an iron making process, a steel making process, a continuous casting process, and a rolling process.

19. The smart factory platform of claim 1, further comprising a data collection system, the data collection system comprising (i) a plurality of measuring instruments or sensors that collect data generated in each of the continuously-performed processes and (ii) a programmable controller, a programmable logic controller (PLC), and/or a distributed control system (DCS) that integrates or controls the collection data obtained from the measuring instruments or sensors.

20. The smart factory platform of claim 1, further comprising a network system that transfers the collection data to the distributed parallel processing system, wherein the network system includes a network cable, a gateway, a router, and an access point.

21. The smart factory platform of claim 1, wherein the distributed parallel processing system further includes a middleware system that preprocesses the collection data, the middleware system including an interface unit and a queue server.

22. The smart factory platform of claim 21, wherein the interface unit standardizes the collection data to generate standardization data, and the queue server stores the standardization data.

23. The smart factory platform of claim 1, wherein the equipment mapping performing unit maps the equipment ID to standardization data to generate part of the mapping data, wherein the standardization data is obtained from the equipment.

* * * * *